July 16, 1968  H. MÜLLER  3,392,828
SEPARATION OF SUBSTANCES
Filed Jan. 21, 1965

Inventor:
HANS MÜLLER
By Shoemaker and Mattare
ATTYS.

3,392,828
SEPARATION OF SUBSTANCES
Hans Müller, Zurich, Switzerland, assignor to Process
Engineering Co., Inc., Mannedorf, Zurich, Switzerland
Filed Jan. 21, 1965, Ser. No. 427,012
Claims priority, application Switzerland, Jan. 23, 1964,
787/64
6 Claims. (Cl. 209—13)

ABSTRACT OF THE DISCLOSURE

Apparatus for separating substances dispersed in a liquid. The apparatus comprises a container, a screening drum rotatably mounted in the container, and means for introducing the liquid containing the dispersed substances into the drum. The drum is provided with an inward connection for the liquid at one end and an outlet connection at the other end, both said connections being concentric with the axis of rotation of the drum and the drum being inclined to the horizontal so that the inlet connection is located at a level higher than the outlet connection.

---

This invention relates to apparatus for separating heterogeneous mixtures of materials.

It is known for heterogeneous mixtures of materials, for example with different grain sizes, to be separated into the coarser and finer portions by screening when dry or in a liquid. It is also known for such mixtures to be divided by flotation, i.e., by separation in a flowing liquid. Flotation is suitable when the individual particles of material are of different sizes or of different specific weights. In coal mines, for example, the coal particles are separated in this way from the particles of rock. A large number of instruments and apparatuses have been provided both for screening and for flotation. Both separation by screening and separation by flotation have their advantages and disadvantages, and the choice of a suitable apparatus depends on the mixtures in question and their physical and chemical properties.

There are cases in which both screening and flotation are desirable. This is particularly the case when the particles have to be simultaneously washed.

The invention aims to provide an apparatus with the aid of which combined screening and flotation can be carried out and the particles simultaneously washed out.

In accordance with the present invention there is provided an apparatus for separating substances dispersed in a liquid, which apparatus comprises a container, a screening drum rotatably mounted in the container and means for introducing the liquid into the drum, the drum being provided with an inlet connection for the liquid at one end and an outlet connection at the other end, the connections being concentric to the axis of rotation of the drum and the drum being inclined to the horizontal so that the inlet connection is above the outlet connection wherein some of the substances in the liquid pass through the screen of the drum and coarse substances unable to pass through the drum screen are retained in the drum or are removed by other means.

Figure 1:
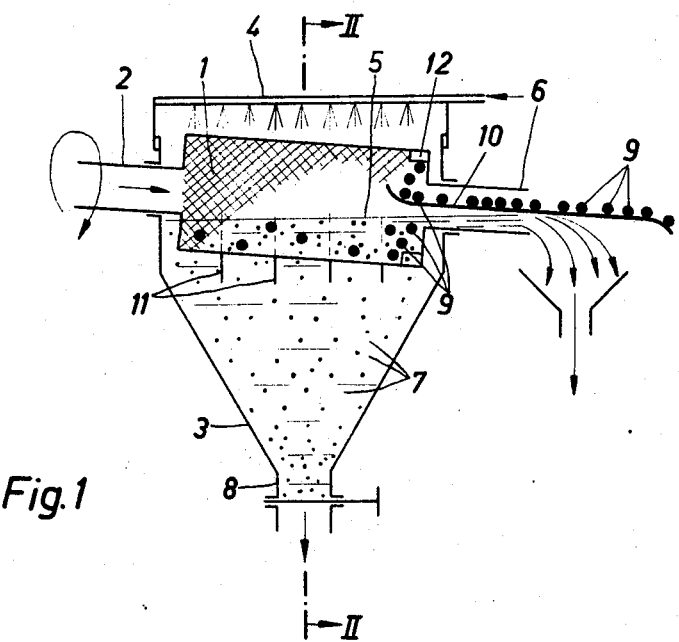
Figure 2:
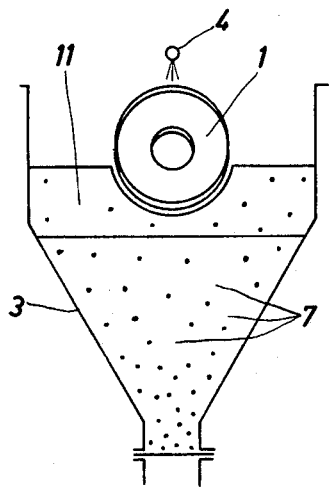

An example of the invention is illustrated diagrammatically in the accompanying drawings, in which:

FIG. 1 is a longitudinal section through one example of apparatus according to the invention; and FIG. 2 is a section taken along the line II—II in FIG. 1.

Referring to the drawings, the apparatus comprises a screening drum 1 into which the mixture to be separated is inserted through one end 2 of an inlet which is in the form of a hollow shaft. The drum rotates about a somewhat inclined axis in a container 3 partially filled with a liquid. The liquid, which may be inserted either through the inlet connection 2 together with the mixtures to be separated or through a spray pipe 4 with nozzles, or, if desired, by both methods simultaneously, forms a liquid level 5 in the container 3.

The axis of the drum 1 is so inclined that the liquid in it can emerge only from the end remote from the inlet 2 through an outlet connection 6. In this way the flow is from left to right with respect to FIG. 1 of the drawings.

Assuming that the mixture to be separated contains fine granular particles 7 with a larger specific weight than the liquid and a smaller diameter than the holes in the drum, rotation of the drum 1 will cause the fine grains to pass through the holes in it and collect at the bottom of the container 3. From the bottom of the container the grains 7 may be emptied out through a discharging pipe 8 for washing or other treatment.

If the mixture also contains particles which are heavier than the liquid but larger in diameter than the holes in the drum, then these remain inside the drum and move from left to right owing to the inclination of the axis of the drum. The coarse particles 9 may also be removed continuously from the inside of the drum, for example by providing vanes 12 on the internal periphery of the right hand end of the drum to convey them upwardly. From there they drop onto a chute 10 by which they are led off from the container 3. Those portions of the mixture supplied which are lighter than the liquid or which can be made to float by the flow of the stream are carried along by the liquid and leave the drum with it, travelling along the bottom of the outlet 6.

The function of the liquid sprayed onto the rotating drum 1 with the aid of the spray pipe 4 and the nozzles is constantly to remove particles which might clog up the screen of the drum from the inside.

The drum 1 may be rotated either in the same direction all the time or in both directions alternately.

In order to prevent the sedimentation of the grains 7 in the container 3 from being disturbed by the flow of liquid sheets of metal 11 may be fitted in the container so as to surround the drum and divide the container into various segments. The sheets 11 may extend down into the conical part of the container 3 or merely to a certain depth, depening on the case in question.

An example will now be given to provide a better illustration of the invention.

For so called alluvial filtration, where liquids are filtered through filtering aids, it is often desirable to recover the alluvial materials such as kieselguhr, plastic granulates, carbon powder cellulose fibres, etc. For this purpose the filtering aids have to be separated from the dirt particles filtered out of the liquid and washed. If, for example, the filtering aid consists of kieselguhr and the dirt filtered out consists of cellulose fibres (from fruit) and coarse impurities, then this mixture is emptied out of the exhausted filter, stirred up in water and pumped into the apparatus described. Water is sprayed onto the rotating drum from the spray pipe.

The kieselguhr, which is heavier than water, sinks and is emptied out washed; it can then be used again.

The cellulose fibres are washed away with the washing water. The coarse dirt particles are left in the drum or discharged down the chute.

In such a "filtration regenerate" there are of course still finer dirt particles which are washed away together with the cellulose fibres.

This mechanical separation may obviously be combined with chemical washing of the mixture to be separated. Thus acids, alkalis, or other chemical reagents may be mixed into the flotation water.

Other embodiments and modifications of the present

I claim:

1. Apparatus for separating particles dispersed in a liquid, comprising a container adapted to be filled to a predetermined level; a screening drum rotatably mounted in said container and being provided with a perforated peripheral wall and at each of its axial ends with an opening, a coaxial tubular first member provided with a free and extending through said opening at one of said axial ends and comprising an inlet, and a coaxial tubular second member provided with a free end and extending through said opening at said other axial end and comprising an outlet, said inlet and said outlet being located outside the confines of said container, said screening drum being inclined to the horizontal so that said inlet is located above said predetermined level while said outlet is partially located below said predetermined level; means for introducing a stream of the dispersion into said inlet for flowing in the direction toward said outlet so that said finer particles contained in said dispersion will pass through the wall of said screening drum into said container to subsequently descend in said liquid contained therein while said coarser particles and said floatable fraction will be carried along by the flowing dispersion and move in the direction toward said outlet means for for segregating said coarser particles from said floatable fraction and for discharging both separately from said screening drum through said outlet thereof directly to the exterior of said container, whereby to prevent readmixing of said floatable fraction with said finer particles in the liquid in said container; and a plurality of parallel dividing walls arranged in said container transversely of said drum and spaced from one another in axial direction thereof so as to subdivide said container into individual compartments and thereby reduce formation of eddy currents in said liquid in the container, said means including an elongated inclined chute extending through said outlet into the interior of said drum and terminating adjacent said opening through which said second tubular member communicates.

2. Apparatus as defined in claim 1, wherein said inlet and said outlet are both concentric with the axis of rotation of said screening drum.

3. Apparatus as defined in claim 1; and further comprising rinsing means for said screening drum and comprising an elongated pipe provided with a plurality of longitudinally spaced discharge orifices and arranged above said drum axially parallel therewith, and means for feeding a rinsing fluid into said pipe for discharge through said orifices, so that said rinsing fluid passes in inward direction through said peripheral wall of the drum and dislodges particles settled thereon.

4. Apparatus as defined in claim 1; and further comprising a plurality of vanes provided on the inner surface of said peripheral wall.

5. Apparatus as defined in claim 1; and further comprising a plurality of vanes projecting from the inner surface of said peripheral wall said vanes being provided in the region of said outlet and being adapted to raise said coarser particles from the dispersion to be discharged from said drum through said outlet together with but separated from said floating fraction.

6. Apparatus as defined in claim 1, wherein said dividing walls closely surround spaced portions of the outer surface of said peripheral wall of said drum.

References Cited

UNITED STATES PATENTS

| | | | |
|---|---|---|---|
| 347,264 | 8/1886 | Cuvier | 209—270 |
| 1,165,379 | 12/1915 | Alleman | 209—44 |
| 1,445,007 | 2/1923 | Davis | 209—44 |
| 1,467,348 | 9/1923 | Young | 209—270 |
| 1,575,601 | 3/1926 | Knoblauch | 209—270 |
| 2,431,984 | 12/1947 | Bean | 209—270 |

FOREIGN PATENTS

| | | |
|---|---|---|
| 72,400 | 4/1951 | Denmark. |
| 567,798 | 6/1958 | Belgium. |

HARRY B. THORNTON, *Primary Examiner.*

R. HALPER, *Assistant Examiner.*